US010516690B2

(12) United States Patent
Mehta et al.

(10) Patent No.: US 10,516,690 B2
(45) Date of Patent: Dec. 24, 2019

(54) PHYSICAL DEVICE DETECTION FOR A MOBILE APPLICATION

(71) Applicant: Cequence Security, Inc., Sunnyvale, CA (US)

(72) Inventors: Shreyans Mehta, Fremont, CA (US); Ameya Talwalkar, Saratoga, CA (US)

(73) Assignee: Cequence Security, Inc., Sunnyvale, CA (US)

( * ) Notice: Subject to any disclaimer, the term of this patent is extended or adjusted under 35 U.S.C. 154(b) by 0 days.

(21) Appl. No.: 15/012,323

(22) Filed: Feb. 1, 2016

(65) Prior Publication Data

US 2016/0234244 A1    Aug. 11, 2016

Related U.S. Application Data

(60) Provisional application No. 62/114,383, filed on Feb. 10, 2015.

(51) Int. Cl.
*H04L 29/06* (2006.01)
*H04L 29/08* (2006.01)

(52) U.S. Cl.
CPC .......... *H04L 63/1433* (2013.01); *H04L 67/02* (2013.01); *H04L 63/1416* (2013.01)

(58) Field of Classification Search
CPC .................................................. H04L 63/1433
See application file for complete search history.

(56) References Cited

U.S. PATENT DOCUMENTS

| 7,877,461 | B1 * | 1/2011 | Rimmer | H04L 63/0823 |
| | | | | 709/203 |
| 9,313,213 | B2 * | 4/2016 | Kaminsky | G06N 7/00 |
| 9,626,677 | B2 * | 4/2017 | Turgeman | G06Q 20/4016 |
| 9,667,613 | B1 * | 5/2017 | Wisemon | H04L 63/08 |
| 2007/0143501 | A1 | 6/2007 | Pasha et al. | |
| 2007/0244926 | A1 * | 10/2007 | Vitanov | G06F 9/4443 |
| 2010/0332212 | A1 * | 12/2010 | Finkelman | G06F 1/3203 |
| | | | | 703/23 |
| 2012/0324557 | A1 * | 12/2012 | Rubin | G06F 21/50 |
| | | | | 726/7 |
| 2014/0007222 | A1 | 1/2014 | Qureshi et al. | |
| 2014/0096272 | A1 * | 4/2014 | Makofsky | G06F 21/31 |
| | | | | 726/34 |
| 2014/0181193 | A1 * | 6/2014 | Narasimhan | H04L 67/306 |
| | | | | 709/204 |

(Continued)

*Primary Examiner* — Harris C Wang

(57) ABSTRACT

Techniques to facilitate detection of whether or not applications are executed on physical devices are disclosed herein. In at least one implementation, a mobile application that generates a web service request is executed on a computing system. The computing system executes a client security component of the mobile application to collect attributes associated with the computing system and an operating environment on which the mobile application is executing, and utilizes a mobile application programming interface to transfer the web service request including the attributes for delivery to a web server. The web server executes a server security component of a web service to extract the attributes from the web service request and process the attributes to determine whether or not the mobile application is being executed on a physical mobile device.

20 Claims, 6 Drawing Sheets

(56) References Cited

U.S. PATENT DOCUMENTS

| | | | |
|---|---|---|---|
| 2015/0237049 A1* | 8/2015 | Grajek | H04L 63/0815 |
| | | | 726/7 |
| 2015/0356560 A1* | 12/2015 | Shastry | G06Q 20/401 |
| | | | 705/64 |
| 2016/0112416 A1* | 4/2016 | Brown | H04L 63/0861 |
| | | | 726/5 |
| 2016/0191236 A1* | 6/2016 | Smirnoff | H04L 63/062 |
| | | | 713/171 |
| 2016/0219072 A1* | 7/2016 | Mehta | H04L 67/02 |
| 2016/0234244 A1* | 8/2016 | Mehta | H04L 63/1433 |
| 2017/0277891 A1* | 9/2017 | Keppler | G06F 21/566 |

* cited by examiner

PHYSICAL DEVICE DETECTION FOR A MOBILE APPLICATION

RELATED APPLICATIONS

This application claims the benefit of, and priority to, U.S. Provisional Patent Application No. 62/114,383, entitled "PHYSICAL DEVICE DETECTION FOR A MOBILE APPLICATION", filed Feb. 10, 2015, which is hereby incorporated by reference in its entirety for all purposes.

TECHNICAL BACKGROUND

Traditional web services that are accessed by a web browse typically utilize hypertext markup language (HTML) and Javascript, which provide the capability to determine legitimate use of the web service, such as presenting Completely Automated Public Turing tests to tell Computers and Humans Apart (CAPTCHAs) and other challenge questions to the user. However, unlike traditional web services, wireless communication devices often employ mobile applications to communicate with web servers. For example, typical mobile applications pull data down from web servers for display to the user, and also allow the user to modify the data and submit it back to the server.

Mobile applications commonly utilize mobile application programming interfaces (APIs) to communicate with external web services and provide their functionality to the user. The communication between native mobile applications and mobile APIs on the web servers is commonly done using JavaScript Object Notation (JSON), Extensible Markup Language (XML), and other protocols that do not employ security techniques but are simply used to provide an exchange of data between the client and server. Thus, the core application communication between the mobile application and the web service utilizes a mobile API with no security in place to validate the legitimacy of the request.

Although mobile applications are typically designed to run on physical mobile devices, other software-based platforms have been developed that are also capable of running mobile applications, such as standard and non-standard emulators, virtual machines, and host environments, such as web browsers and other operating environments. Unfortunately, such software-based operating environments may be easier to exploit by malicious users to launch security attacks using mobile applications.

Overview

Techniques to facilitate detection of whether or not applications are executed on physical devices are disclosed herein. In at least one implementation, a mobile application that generates a web service request is executed on a computing system. The computing system executes a client security component of the mobile application to collect attributes associated with the computing system and an operating environment on which the mobile application is executing, and utilizes a mobile application programming interface to transfer the web service request including the attributes for delivery to a web server. The web server executes a server security component of a web service to extract the attributes from the web service request and process the attributes to determine whether or not the mobile application is being executed on a physical mobile device.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Mobile applications are software programs that are typically designed to be executed on physical mobile devices. However, other platforms have been developed that are also capable of running mobile applications, such as standard and non-standard emulators, virtual machines, and host environments, such as web browsers and other operating environments. Unfortunately, such software-based operating environments may be exploited by malicious users and re-provisioned to launch security attacks using mobile applications. Therefore, determining that a mobile application is running on a physical device is a good indicator that the mobile application is being used for legitimate purposes.

Implementations are disclosed herein for positively identifying that a mobile application is running on a physical mobile device. In at least one implementation, attributes about the device and the operating environment on the device are collected from within the mobile application. The mobile application can then send the collected attributes to a server for processing and determining whether or not the mobile application is running on a physical mobile device.

Figure 1:
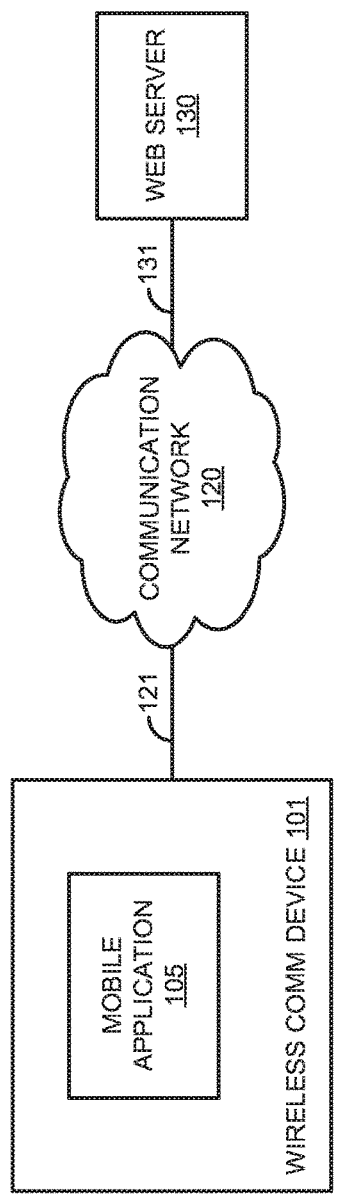
FIG. 1 is a block diagram that illustrates a communication system.

FIG. 1 is a block diagram that illustrates communication system 100. Communication system 100 includes wireless communication device 101, communication network 120, and web server 130. Wireless communication device 101 includes mobile application 105. Wireless communication device 101 and communication network 120 communicate over communication link 121. Communication network 120 and web server 130 are in communication over communication link 131.

In operation, mobile application 105 can collect various attributes at runtime from wireless communication device 101 and its operating environment. In some implementations, the attribute collection process may be performed by a client security component embedded into mobile application 105. The attributes that may be collected by mobile application 105 typically relate to the hardware components that may be present or absent in wireless communication device 101 and the operating environment in which mobile application 105 is running, among other factors. Presence or absence of a combination of these attributes can be used to determine if mobile application 105 is running on a physical device. In the example of communication system 100, wireless communication device 101 is indeed a real, physical hardware device, so the attributes collected by mobile application 105 should reflect the physical nature of wireless communication device 101.

Figure 2:
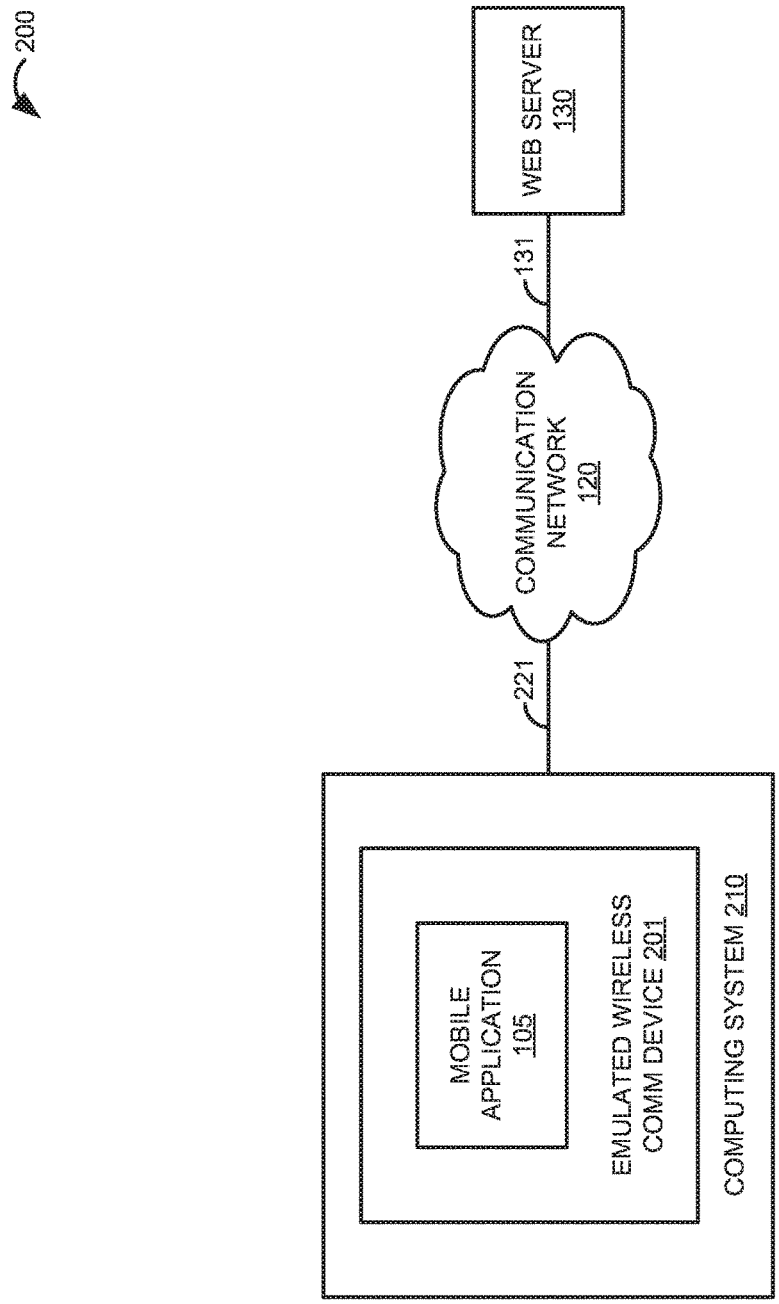
FIG. 2 is a block diagram that illustrates a communication system.

FIG. 2 is a block diagram that illustrates communication system 200. Communication system 200 includes computing system 210, communication network 120, and web server 130. Computing system 210 includes emulated wireless communication device 201. Emulated wireless communication device 201 includes mobile application 105. Computing system 210 and communication network 120 communicate over communication link 221. Communication network 120 and web server 130 are in communication over communication link 131.

Communication system 200 is provided to show an exemplary scenario in which mobile application 105 is not executed on a physical mobile device, but instead is being run on emulated wireless communication device 201. Emulated wireless communication device 201 is a software program designed to run on the physical hardware of computing system 210. When loaded and executed by computing system 210, emulated wireless communication device 201 simulates the processor, instruction set, and other aspects of a real, physical mobile device to create a virtualized operating environment capable of executing mobile application 105. Since emulated wireless communication device 201 is implemented in software, it is much easier for malicious persons to use mobile application 105 to perpetrate network attacks using automation and other security-compromising techniques. One implementation for determining whether mobile application 105 is running on a physical mobile device, such as wireless communication device 101 of communication system 100, or a software-based environment, such as emulated wireless communication device 201, will now be discussed with respect to FIG. 3.

Figure 3:
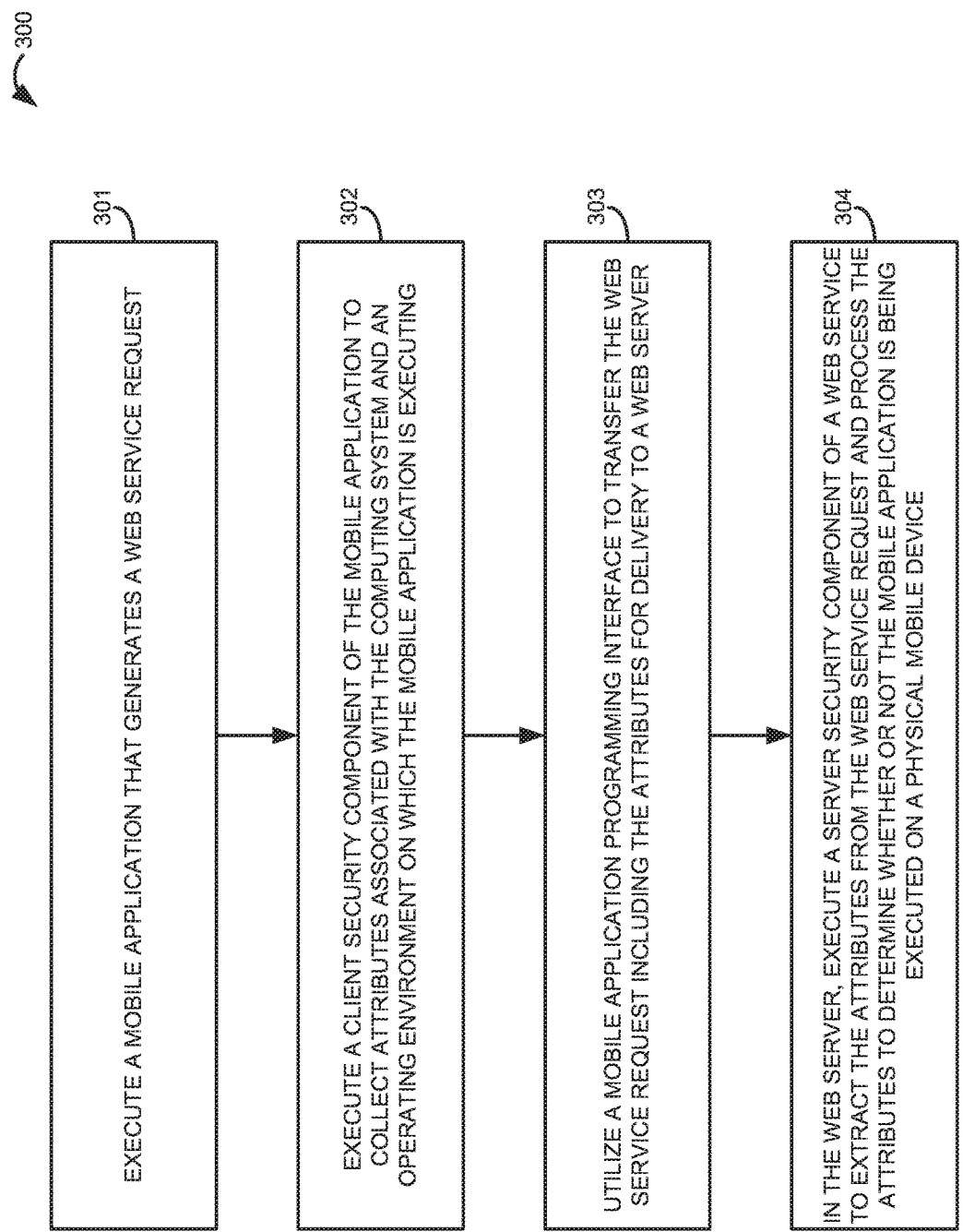
FIG. 3 is a flow diagram that illustrates an operation of a communication system.

FIG. 3 is a flow diagram that illustrates an operation 300 of communication systems 100 and 200. The operation 300 shown in FIG. 3 may also be referred to as device detection process 300 herein. The steps of the operation are indicated below parenthetically. The following discussion of operation 300 will proceed with reference to wireless communication device 101, computing system 210, and web server 130 of FIGS. 1 and 2 in order to illustrate its operations, but note that the details provided in FIGS. 1 and 2 are merely exemplary and not intended to limit the scope of process 300 to the specific implementations shown in FIGS. 1 and 2.

Operation 300 may be employed to facilitate detection of whether or not mobile application 105 is being executed on a physical device. As shown in the operational flow of process 300, a computing system executes mobile application 105 that generates a web service request (301). The computing system that executes mobile application 105 could comprise any system capable of executing mobile application 105. In some examples, the real, physical wireless communication device 101 may be executing mobile application 105. In another example, computing system 210 could be running emulated wireless communication device 201, with emulated wireless communication device 201 executing mobile application 105. As discussed above, operation 300 can be employed to determine whether mobile application 105 is being executed on a physical mobile device, such as wireless communication device 101, as opposed to a software-based execution environment such as emulated wireless communication device 201.

Mobile application 105 could comprise any software application designed to be executed on a mobile device. For example, mobile application 105 could comprise a streaming media application, video application, audio application, news client, gaming application, sports application, social media application, web browser, messaging application, or any other software application—including combinations thereof. The web service request is typically generated by mobile application 105 in response to some user input, such as a user launching the application, clicking a link presented by the application, entering data into a form field on the application for submission to web server 130, or responsive to any other user action. However, in some examples, the web service request could be automatically generated by mobile application 105, including in response to a request from another application. Typically, the web service request comprises instructions to direct a web service to either retrieve data from web server 130 and/or instructions to store data transferred by mobile application 105 in web server 130. For example, the web service request could comprise a query, message, notification, command, request, instruction, or any other communications between mobile application 105 and web server 130, including combinations thereof.

A client security component of mobile application 105 is executed to collect attributes associated with the computing system and an operating environment on which mobile application 105 is executing (302). The client security component of mobile application 105 typically collects the attributes and includes them in the web service request. In some examples, the attributes gathered by the client security component of mobile application 105 could include identifiers associated with the device on which mobile application 105 is running, such as a user identifier, device identifier, telephone number, Media Access Control (MAC) address, Electronic Serial Number (ESN), Mobile Station Identifier (MSID), Mobile Equipment Identifier (MEID), Mobile Station International Subscriber Directory Number (MSISDN), International Mobile Equipment Identity (IMEI), International Mobile Subscriber Identity (IMSI), or any other device information—including combinations thereof. Presence of one or more of these identifiers could help to indicate that the device is a physical device, and the identifiers included in the attributes could also be verified with communication service providers to determine their legitimacy in some examples.

The attributes collected by the client security component of mobile application 105 could also include various timestamps, such as the date and time when the device was activated, device boot time, uptime, and when mobile application 105 was installed on the device. Generally, the more time that has elapsed for any of these attributes, the more likely the device is a real, physical device. The attributes could also indicate if mobile application 105 is signed by the original creator of the application, which would go towards a finding of a legitimate application being executed on a physical device. The client security component of mobile application 105 could also determine and provide a list of all other applications that are installed on the device, along with indicating historically run and currently running applications. Generally, the installation of many applications on the device is a good indicator of a physical device, since malicious users typically only install the desired application on simulations.

The client security component of mobile application 105 could also determine the presence of physical hardware on the device running application 105, which would be indicative of a physical device. In some implementations, hardware components could be detected or polled by the client security component of mobile application 105 to determine their presence or absence. Additionally or alternatively, the client security component could check operating system files and features for evidence of certain hardware, among other hardware detection techniques. Some examples of hardware components that may be detected by the client security component include a camera device, Bluetooth, Wi-Fi, third generation (3G), fourth generation (4G), and other types of wireless radios and associated hardware, global positioning system (GPS) hardware, an accelerometer, a battery, a fingerprint reader and/or fingerprint recognition features, such as a Touch ID device, and any other hardware components that may be included in a physical mobile device. In addition to the presence of a Bluetooth radio signal, the ability to enable and disable Bluetooth on the device, the presence of previously paired devices in the Bluetooth paired device list, and the presence of an active paired device are also attributes that the client security component could detect that would indicate a physical mobile device. Likewise, the presence of a Wi-Fi signal, the ability to enable and disable Wi-Fi on the device, the presence of an active Wi-Fi access point connection, the presence of other available Wi-Fi access points in the area, and a list of known Wi-Fi access points to which the device previously connected are other features that the client security component of mobile application 105 could determine that are indicative of a physical mobile device. Additionally, the client security component may detect the network status of the mobile device switching from Wi-Fi to 3G/4G or other types of wireless communication network signals, or disabling the wireless radio entirely, such as by switching to an airplane mode. The availability of a geo-location signal for the device is also an attribute indicative of a physical mobile device. The attributes could also comprise various power states of the mobile device, including when the device's power status switches from battery power to line power, and that the battery status is "charging" when the device is plugged in, and the battery power level drops below one hundred percent when the device is operating on battery power and is not plugged in.

In addition to the above hardware and associated features, the client security component of mobile application 105 could detect various user content and associated software present on the device to include in the attributes that are indicative of a physical device. For example, since a simulation would not likely include such user content, multiple entries in the contact list and/or photo album of the mobile device would indicate a real device, such as names, email addresses, and telephone numbers of contacts, photographs, videos, sound recordings, and other user-generated content. Likewise, the presence of voicemails and/or emails in the user's inboxes, and multiple entries in messenger applications are also indicative of a physical mobile device. Some examples of popular messenger applications that could contain user messages include standard Short Message Service (SMS) text messages, iMessage, Google Talk, Google Hangout, Google Voice, WhatsApp, Viber, Skype, and the like. The client security component of mobile application 105 may also detect the presence of application stores installed on the device that may be used to download new or updated applications, such as Google Play, Apple App Store, third-party application stores such as Cydia, and others. Note that the factors listed above are merely exemplary, and additional information that may be used to determine the physical nature of the device on which mobile application 105 is running could be included in the attributes by the client security component and is within the scope of this disclosure.

Mobile application 105 then utilizes a mobile application programming interface (API) to transfer the web service request including the attributes it collected for delivery to web server 130 (303). Typically, the mobile API is used as an interface to exchange data between a mobile application executing on a mobile device and a web service provided by web server 130. However, since the mobile API typically allows this data exchange to occur without regard to security, web server 130 may utilize the attributes included in the web service request to verify and validate the request. In at least one implementation, the client security component of mobile application 105 embeds the security attributes into the web service request before the request is transferred to web server 130. The attributes that are included in the request may be transparent to the application, the mobile API, and the web service in some implementations.

Web server 130 executes a server security component of a web service to extract the attributes from the web service request and process the attributes to determine whether or not mobile application 105 is being executed on a physical mobile device (304). All of the attributes listed above do not need to be present for the server security component of the web service to determine if mobile application 105 is being executed on a physical mobile device, but each factor strengthens the determination. In some implementations, a threshold number of attributes could be used to determine when enough of the attributes exist to determine that mobile application 105 is being executed on a physical mobile device, such as wireless communication device 101. For example, the server security component could compare a total number of the attributes received in the web service request to a threshold number of attributes to determine whether or not mobile application 105 is being executed on the physical mobile device. The greater the number of attributes extracted from the web service request, the higher the likelihood that mobile application 105 is being executed on a physical mobile device, so the client security component could determine that mobile application 105 is being executed on a physical mobile device when the total number of the attributes exceeds the threshold number. Accordingly, the threshold number of attributes could be increased to provide greater security protection for the web service. If the server security component of the web service determines that mobile application 105 is being executed on a physical mobile device, this determination may be used as at least one factor to validate the web service request as a legitimate request. In some implementations, once the request is validated, the server security component of the web service removes the attributes and any other security information from the web service request and provides the request to the web service. In this manner, the attributes and request validation remain transparent to the web service, thereby not requiring any modifications to the communication protocol and mobile API used between mobile application 105 and the web service.

Advantageously, the client security component of mobile application 105 transparently adds various attributes to web service requests when the application communicates with a web service using a mobile API. The attributes included in the web service request enable the server security component of the web service to determine whether or not the mobile application is being executed on a physical mobile device. If the web service determines that mobile application 105 is running on a physical device, this may be used as an indication that the web service request issued from mobile application 105 is a legitimate request, and the web service may process the request. By securing the web service from malicious use, the techniques described herein provide the technical advantage of reducing the load on the processor, network components, and other elements of web server 130 by eliminating illegitimate requests, while also safeguarding the information of users of the web service. Further, because the collection, exchange, and processing of the various attributes is handled transparently by the security components of the mobile application 105 and the web service, these two endpoints are unaware of the additional security measures and validation that occurs to safeguard the information exchange. In this manner, the web service has a higher degree of confidence in the legitimacy of the web service request if the web service determines that mobile application 105 is running on a physical mobile device, and possible exploitation of the mobile API to perform malicious actions can be blocked in the alternative.

Referring back to FIG. 1, wireless communication device 101 may comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and a communication network.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment—including combinations thereof. Communication network 120 may also comprise optical networks, asynchronous transfer mode (ATM) networks, packet networks, local area networks (LAN), metropolitan area networks (MAN), wide area networks (WAN), or other network topologies, equipment, or systems including combinations thereof. Communication network 120 may be configured to communicate over metallic, wireless, or optical links Communication network 120 may be configured to use time-division multiplexing (TDM), Internet Protocol (IP), Ethernet, optical networking, wireless protocols, communication signaling, or some other communication format—including combinations thereof. In some examples, communication network 120 includes further access nodes and associated equipment for providing communication services to several computer systems across a large geographic region.

Web server 130 comprises a processing system and communication transceiver. Web server 130 may also include other components such as a router, server, data storage system, and power supply. Web server 130 may reside in a single device or may be distributed across multiple devices. Web server 130 may be a discrete system or may be integrated within other systems including other systems within communication system 100. In some examples, web server 130 could comprise a network switch, router, switching system, packet gateway, network gateway system, Internet access node, application server, database system, service node, firewall, or some other communication system—including combinations thereof.

Communication links 121, 131, and 221 use metal, air, space, optical fiber such as glass or plastic, or some other material as the transport medium including combinations thereof. Communication links 121, 131, and 221 could use various communication protocols, such as TDM, IP, Ethernet, telephony, optical networking, hybrid fiber coax (HFC), communication signaling, wireless protocols, or some other communication format including combinations thereof. Communication links 121, 131, and 221 could be direct links or may include intermediate networks, systems, or devices.

Computing system 210, shown in FIG. 2, may be representative of any computing apparatus, system, or systems on which the techniques disclosed herein or variations thereof may be suitably implemented. Computing system 210 provides an example of a computing system that could be used as a either a server or a client device in some implementations, although such devices could have alternative configurations. Examples of computing system 210 include mobile computing devices, such as cell phones, tablet computers, laptop computers, notebook computers, and gaming devices, as well as any other type of mobile computing devices and any combination or variation thereof, including wireless communication device 101. Examples of computing system 210 also include desktop computers, server computers, and virtual machines, as well as any other type of computing system, variation, or combination thereof.

Figure 4:
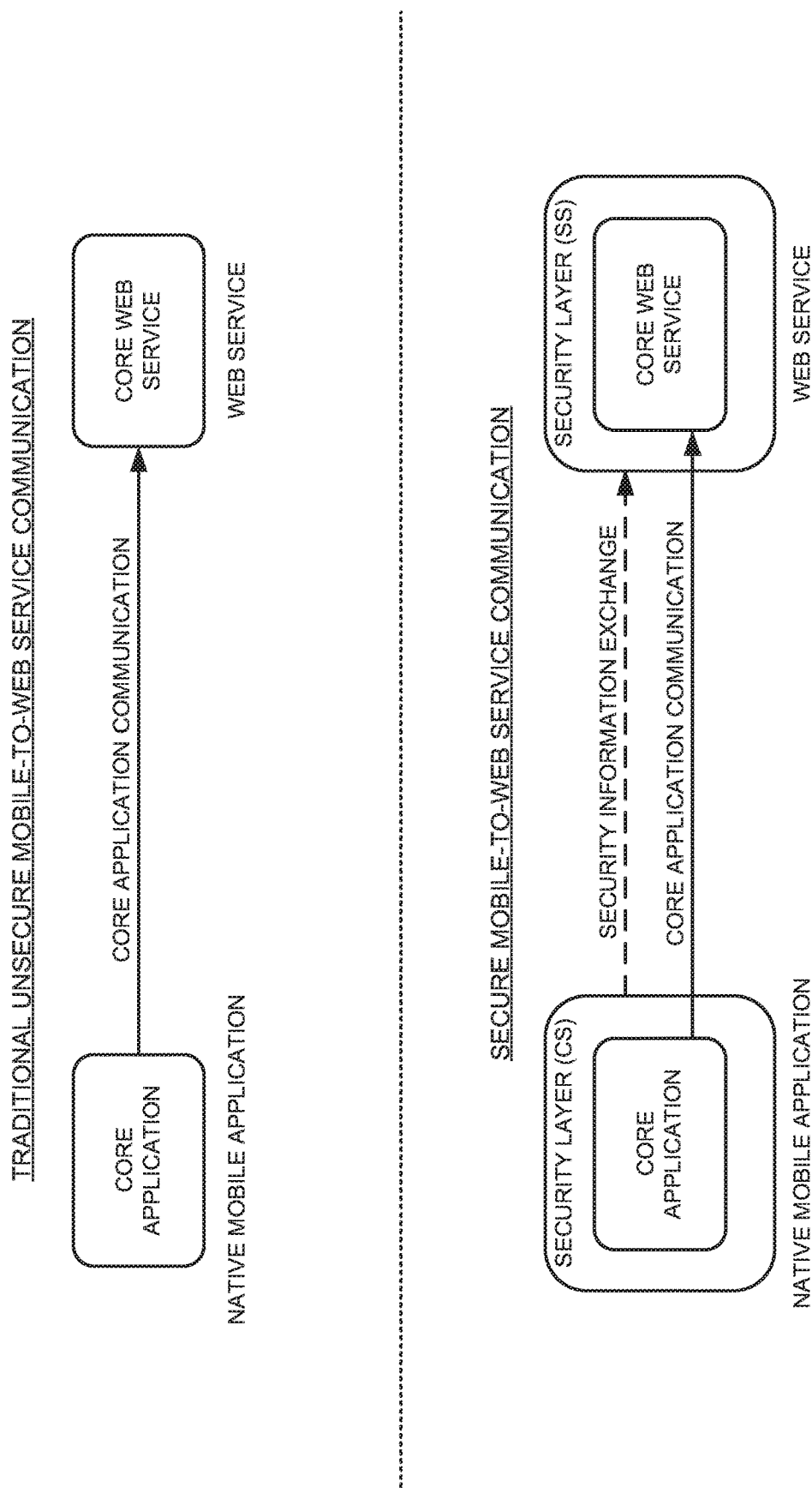
FIG. 4 is a block diagram that illustrates an operation of a communication system in an exemplary embodiment.

FIG. 4 is a block diagram that illustrates an operation of a communication system an exemplary embodiment. The techniques described in FIG. 4 could be executed by communication systems 100 and/or 200 and could be combined with operation 300 of FIG. 3 in some implementations. FIG. 4 is divided into two sections, separated by a dotted line. The top half of FIG. 4, labeled "Traditional Unsecure Mobile-To-Web Service Communication", illustrates a typical, unsecure data exchange between a native mobile application executing on a wireless communication device and a web service provided by a web server. Traditional web services that are accessed by a web browser typically utilize hypertext markup language (HTML) and Javascript, which provide the capability to bundle code along with the data that may be used to determine legitimate use of the web service, such as presenting Completely Automated Public Turing tests to tell Computers and Humans Apart (CAPTCHAs) and other challenge questions to the user.

However, native mobile applications utilize mobile APIs to communicate with external web services and provide their functionality to users. Typically, most of the data utilized by a mobile application resides on the server, and the server also commonly performs operations on the data such as addition, deletion, and modification, often in response to a user request made to the application. The communication between native mobile applications and mobile APIs on a web server is typically done using JavaScript Object Notation (JSON), Extensible Markup Language (XML), and other protocols that do not employ security techniques but are simply used to provide an exchange of data between the client and server. Thus, the core application communication between the mobile application and the web service typically utilizes a mobile API with no security in place to validate the legitimacy of the request. Unfortunately, these weaknesses are easily exploited to bypass the security solutions used on traditional web services and allow unauthorized communication with web servers using the mobile API, subjecting the web service to possible malicious use. For example, a malicious user could attempt unauthorized user login, fake account creation, fraudulent data submission to the server, data theft from the server by impersonating a user/device, and other unauthorized actions.

Turning now to the lower portion of FIG. 4, labeled "Secure Mobile-To-Web Service Communication", security components are added to the native client application as well as the web service. In FIG. 4, the security component added to the mobile application is designated as client side (CS), and the security layer added to the web service is designated as server side (SS). When a legitimate native mobile application communicates with the web service, the CS security layer transparently injects additional security information to the communication, including the attributes that are indicative of the mobile application being executed on a physical mobile device, as discussed above with respect to FIG. 3. The security information could also include other data, such as additional device attributes, user behavior attributes, unique transaction identifiers, and any other pertinent information. In some implementations, in addition to or alternatively to including the attributes in the web service request, the CS security layer of the mobile application could process the attributes to determine whether or not the mobile application 105 is being executed on a physical mobile device, and transfer an indication of this determination to the web server in the security information.

The security information received by the web server is then used by the SS security layer to determine legitimate or malicious intent. One factor weighing in favor of legitimate intent is the determination that the mobile application is being executed on a physical mobile device based on the attributes included in the security information. Upon determining legitimate intent, the SS security layer then strips off the security information from the web request before the request is provided to the actual web service. In this manner, the security information and validation determination remain transparent to the mobile application and the web service, allowing them to utilize the original communication protocol used to exchange data between the mobile application and the web service without modification. As such, the two endpoints are unaware that the injection and filtering of additional security information has occurred. The CS and SS security layers work to ensure that only legitimate native mobile applications with clean user behavior are allowed to use the web service, and any possible exploitation of mobile APIs is blocked.

Beneficially, the CS security component transparently adds additional security information to a web request when a native mobile application communicates with web services using mobile APIs. The security information is then inspected, validated, and filtered by the SS security component at the web server as described above, thereby securing the mobile APIs used by the mobile application.

Figure 5:
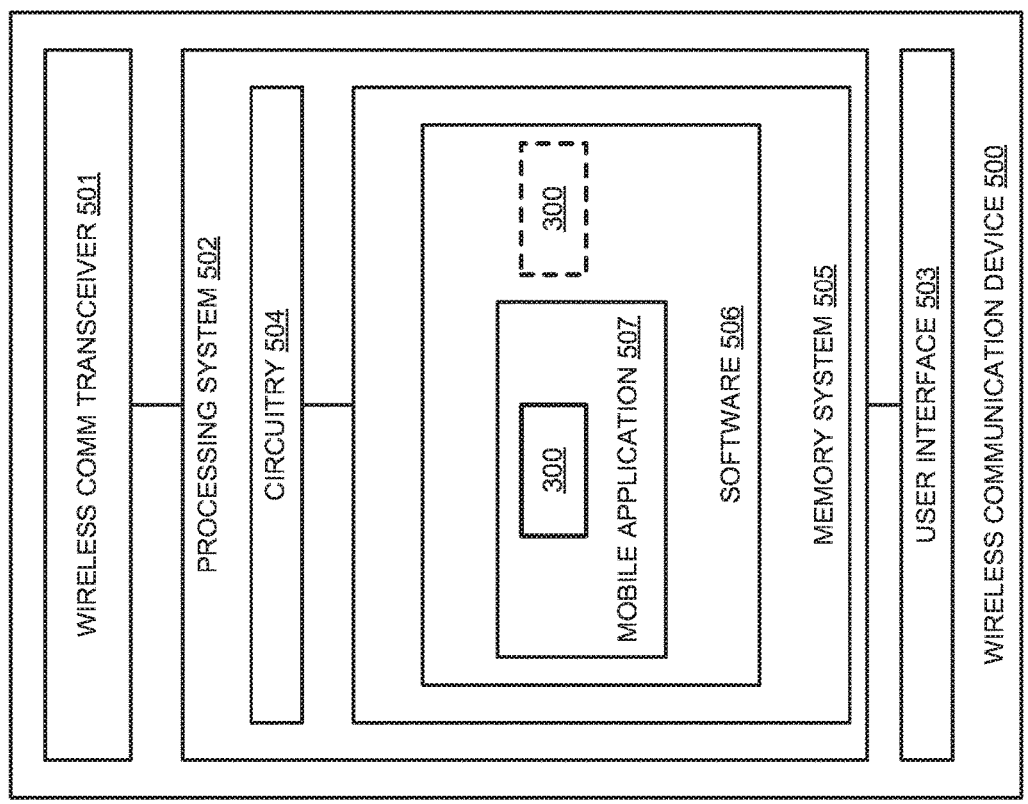
FIG. 5 is a block diagram that illustrates a wireless communication device.

FIG. 5 is a block diagram that illustrates wireless communication device 500. Wireless communication device 500 provides an example of wireless communication device 101, although device 101 could use alternative configurations. Wireless communication device 500 comprises wireless communication transceiver 501, processing system 502, and user interface 503. Processing system 502 is linked to wireless communication transceiver 501 and user interface 503. Processing system 502 includes processing circuitry 504 and memory system 505 that stores operating software 506. Operating software 506 comprises mobile application 507 which itself includes device detection process 300. Device detection process 300 may optionally be implemented separately from mobile application 507. Wireless communication device 500 may include other well-known components such as a battery and enclosure that are not shown for clarity. Wireless communication device 500 may comprise a telephone, computer, e-book, mobile Internet appliance, media player, game console, wireless network interface card, or some other wireless communication apparatus—including combinations thereof.

Wireless communication transceiver 501 comprises RF communication circuitry and an antenna. The RF communication circuitry typically includes an amplifier, filter, RF modulator, and signal processing circuitry. Wireless communication transceiver 501 may also include a memory system, software, processing circuitry, or some other communication device. Wireless communication transceiver 501 may use various protocols, such as CDMA, GSM, UMTS, HSPA, EV-DO, EV-DO rev. A, 3GPP LTE, LIE Advanced, WiMAX, Bluetooth, Internet, telephony, or some other wireless communication format. Wireless communication transceiver 501 may be configured to utilize a mobile application programming interface (API) to transfer a web service request including attributes for delivery to a web server.

User interface 503 comprises components that interact with a user to receive user inputs and to present media and/or information. User interface 503 may include a speaker, microphone, buttons, lights, display screen, touchscreen, touch pad, scroll wheel, communication port, or some other user input/output apparatus—including combinations thereof. User interface 503 may be omitted in some examples.

Processing circuitry 504 comprises microprocessor and other circuitry that retrieves and executes operating software 506 from memory system 505. Processing circuitry 504 may comprise a single device or could be distributed across multiple devices—including devices in different geographic areas. Processing circuitry 504 may be embedded in various types of equipment. Processing circuitry 504 is typically mounted on a circuit board that may also hold memory system 505 and portions of wireless communication transceiver 501 and user interface 503. Memory system 505 comprises a non-transitory computer readable storage medium, such as a disk drive, flash drive, data storage circuitry, or some other hardware memory apparatus.

Memory system 505 may comprise a single device or could be distributed across multiple devices—including devices in different geographic areas. Memory system 505 may be embedded in various types of equipment. In some examples, a computer apparatus could comprise memory system 505 and operating software 506. Operating software 506 comprises computer programs, firmware, or some other form of machine-readable processing instructions, Operating software 506 may include an operating system, utilities, drivers, network interfaces, applications, or some other type of software. In this example, operating software 506 comprises mobile application 507, although software 506 could have alternative configurations in other examples.

When executed by processing circuitry 504, operating software 506 directs processing system 502 to operate wireless communication device 500 as described herein for wireless communication device 101 when executing device detection process 300 or variations thereof. In particular, operating software 506 may direct processing system 502 to execute mobile application 507 that generates a web service request. Further, operating software 506 may direct processing system 502 to execute a client security component of mobile application 507 to collect attributes associated with wireless communication device 500 and an operating environment on which mobile application 507 is executing. In addition, operating software 506 may direct processing system 502 to utilize a mobile application programming interface (API) to transfer the web service request including the attributes for delivery to a web server.

Figure 6:
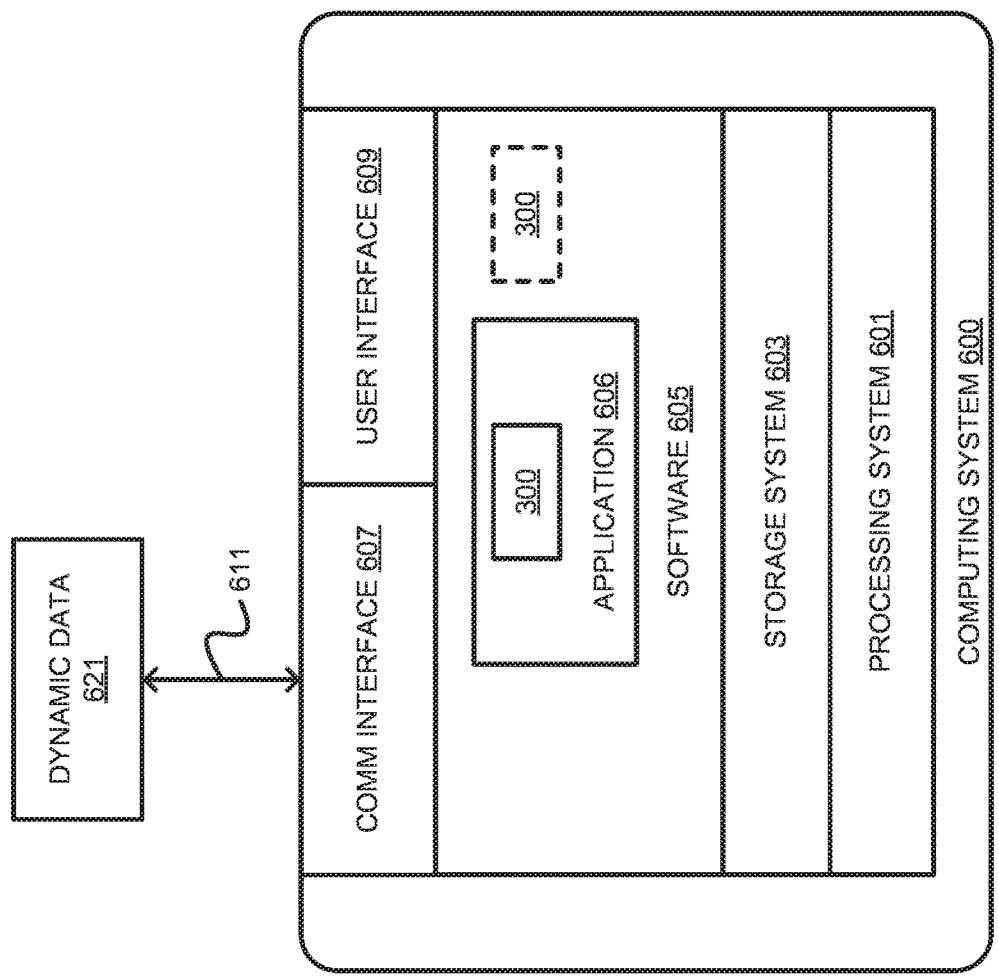
FIG. 6 is a block diagram that illustrates a computing system.

Referring now to FIG. 6, a block diagram that illustrates computing system 600 in an exemplary implementation is shown. Computing system 600 provides an example of computing system 210, although system 210 could use alternative configurations. Computing system 600 could also provide an example of wireless communication device 101, although device 101 could use alternative configurations. Computing system 600 also provides an example of web server 130, although server 130 could use alternative configurations. Computing system 600 includes processing system 601, storage system 603, software 605, communication interface 607, and user interface 609. Software 605 includes application 606 which itself includes device detection process 300. Device detection process 300 may optionally be implemented separately from application 606.

Computing system 600 may be representative of any computing apparatus, system, or systems on which application 606 and device detection process 300 or variations thereof may be suitably implemented. Examples of computing system 600 include mobile computing devices, such as cell phones, tablet computers, laptop computers, notebook computers, and gaming devices, as well as any other type of mobile computing devices and any combination or variation thereof. Note that the features and functionality of computing system 600 may apply as well to desktop computers, server computers, and virtual machines, as well as any other type of computing system, variation, or combination thereof.

Computing system 600 includes processing system 601, storage system 603, software 605, communication interface 607, and user interface 609. Processing system 601 is operatively coupled with storage system 603, communication interface 607, and user interface 609. Processing system 601 loads and executes software 605 from storage system 603. When executed by computing system 600 in general, and processing system 601 in particular, software 605 directs computing system 600 to operate as described herein for computing system 210, wireless communication device 101 and/or web server 130 for execution of device detection process 300 or variations thereof. Computing system 600 may optionally include additional devices, features, or functionality not discussed herein for purposes of brevity.

Referring still to FIG. 6, processing system 601 may comprise a microprocessor and other circuitry that retrieves and executes software 605 from storage system 603. Processing system 601 may be implemented within a single processing device but may also be distributed across multiple processing devices or sub-systems that cooperate in executing program instructions. Examples of processing system 601 include general purpose central processing units, application specific processors, and logic devices, as well as any other type of processing device, combinations, or variations thereof.

Storage system 603 may comprise any computer readable media or storage media readable by processing system 601 and capable of storing software 605. Storage system 603 may include volatile and nonvolatile, removable and non-removable media implemented in any method or technology for storage of information, such as computer readable instructions, data structures, program modules, or other data. Storage system 603 may be implemented as a single storage device but may also be implemented across multiple storage devices or sub-systems co-located or distributed relative to each other. Storage system 603 may comprise additional elements, such as a controller, capable of communicating with processing system 601. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof or any other type of storage media. In no case is the storage media a propagated signal.

In operation, in conjunction with user interface 609, processing system 601 loads and executes portions of software 605, such as application 606 and/or device detection process 300, to facilitate detection of whether or not applications, such as application. 606, are executed on physical devices. When representative of wireless communication device 101 and/or computing system 210, software 605 may be implemented in program instructions and among other functions may, when executed by computing system 600 in general or processing system 601 in particular, direct computing system 600 or processing system 601 to execute a mobile application that generates a web service request, execute a client security component of the mobile application to collect attributes associated with computing system 600 and an operating environment on which the mobile application is executing, and utilize a mobile application programming interface (API) to transfer the web service request including the attributes for delivery to a web server. When representative of web server 130, software 605 may be implemented in program instructions and among other functions may, when executed by computing system 600 in general or processing system 601 in particular, direct computing system 600 or processing system 601 to execute a server security component of a web service to extract the attributes from the web service request and process the attributes to determine whether or not the mobile application is being executed on a physical mobile device.

Software 605 may include additional processes, programs, or components, such as operating system software or other application software. Examples of operating systems include Windows®, iOS®, and Android®, as well as any other suitable operating system. Software 605 may also comprise firmware or some other form of machine-readable processing instructions executable by processing system 601.

In general, software 605 may, when loaded into processing system 601 and executed, transform computing system 600 overall from a general-purpose computing system into a special-purpose computing system customized to facilitate security of an application as described herein for each implementation. For example, encoding software 605 on storage system 603 may transform the physical structure of storage system 603. The specific transformation of the physical structure may depend on various factors in different implementations of this description. Examples of such factors may include, but are not limited to the technology used to implement the storage media of storage system 603 and whether the computer-storage media are characterized as primary or secondary storage.

In some examples, if the computer-storage media are implemented as semiconductor-based memory, software 605 may transform the physical state of the semiconductor memory when the program is encoded therein. For example, software 605 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 600 is generally intended to represent a computing system with which software 605 is deployed and executed in order to implement application 606, device detection process 300, and variations thereof. However, computing system 600 may also represent any computing system on which software 605 may be staged and from where software 605 may be distributed, transported, downloaded, or otherwise provided to yet another computing system for deployment and execution, or yet additional distribution. For example, computing system 600 could be configured to deploy software 605 over the internet to one or more client computing systems for execution thereon, such as in a cloud-based deployment scenario.

Communication interface 607 may include communication connections and devices that allow for communication between computing system 600 and other computing systems (not shown) or services, over a communication network 611 or collection of networks. In some implementations, communication interface 607 receives dynamic data 621 over communication network 611. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 609 may include a voice input device, a touch input device for receiving a gesture from a user, a motion input device for detecting non-touch gestures and other motions by a user, keyboard, mouse, and other comparable input devices and associated processing elements capable of receiving user input from a user. Output devices such as a display, speakers, haptic devices, and other types of output devices may also be included user interface 609. In some examples, user interface 609 could include a touch screen capable of displaying a graphical user interface that also accepts user inputs via touches on its surface. The aforementioned user input devices are well known in the art and need not be discussed at length here. User interface 609 may also include associated user interface software executable by processing system 601 in support of the various user input and output devices discussed above. Separately or in conjunction with each other and other hardware and software elements, the user interface software and devices may provide a graphical user interface, a natural user interface, or any other kind of user interface. User interface 609 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to facilitate detection of whether or not applications are executed on physical devices, the method comprising:
in a computing system:
executing a mobile application that generates a web service request;
executing a client security component of the mobile application to collect attributes associated with the computing system and an operating environment on which the mobile application is executing, wherein the attributes include hardware attributes representative of the physical configuration of the computing system and installed application attributes representative of software applications installed on the computing system, wherein the client security component utilizes hardware detection techniques to detect the presence or absence of physical hardware components in the computing system to determine the hardware attributes representative of the physical configuration of the computing system; and
utilizing a mobile application programming interface to transfer the web service request including the attributes for delivery to a web server; and
in the web server, executing a server security component of a web service to extract the attributes from the web service request and process the attributes to determine whether the mobile application is being executed on a physical mobile device or on an emulated mobile device.

2. The method of claim 1 further comprising, if the server security component of the web service determines that the mobile application is being executed on the physical mobile device, the server security component is configured to use the determination that the mobile application is being executed on the physical mobile device as at least one factor to validate the web service request, and provide the web service request to the web service upon successful validation.

3. The method of claim 2 wherein the server security component configured to provide the web service request to the web service upon successful validation comprises the server security component configured to remove the attributes from the web service request and provide the web service request without the attributes to the web service.

4. The method of claim 1 wherein the computing system comprises the physical mobile device on which the mobile application is being executed.

5. The method of claim 1 wherein the computing system is running the emulated mobile device and wherein the computing system executing the mobile application comprises the computing system executing the mobile application on the emulated mobile device.

6. The method of claim 1 wherein the web server executing the server security component of the web service to process the attributes to determine whether or not the mobile application is being executed on the physical mobile device comprises executing the server security component of the web service to compare a total number of the attributes to a threshold number of attributes to determine whether or not the mobile application is being executed on the physical mobile device.

7. The method of claim 1 wherein the hardware detection techniques utilized by the client security component comprise polling the physical hardware components to determine the presence or absence of the physical hardware components in the computing system.

8. A communication system to facilitate detection of whether or not applications are executed on physical devices, the communication system comprising:
   a computing system configured to execute, using a first processor, a mobile application stored in memory of the computing system to generate a web service request and execute a client security component of the mobile application to collect attributes associated with the computing system and an operating environment on which the mobile application is executing and utilize a mobile application programming interface to transfer the web service request including the attributes for delivery to a web server, wherein the attributes include hardware attributes representative of the physical configuration of the computing system and installed application attributes representative of software applications installed on the computing system, wherein the client security component utilizes hardware detection techniques to detect the presence or absence of physical hardware components in the computing system to determine the hardware attributes representative of the physical configuration of the computing system; and
   the web server configured to execute, using a second processor, a server security component of a web service to extract the attributes from the web service request and process the attributes to determine whether the mobile application is being executed on a physical mobile device or on an emulated mobile device.

9. The communication system of claim 8 further comprising, if the server security component of the web service determines that the mobile application is being executed on the physical mobile device, the server security component is configured to use the determination that the mobile application is being executed on the physical mobile device as at least one factor to validate the web service request, and provide the web service request to the web service upon successful validation.

10. The communication system of claim 9 wherein the server security component configured to provide the web service request to the web service upon successful validation comprises the server security component configured to remove the attributes from the web service request and provide the web service request without the attributes to the web service.

11. The communication system of claim 8 wherein the computing system comprises the physical mobile device on which the mobile application is being executed.

12. The communication system of claim 8 wherein the computing system is running the emulated mobile device and wherein the computing system configured to execute the mobile application comprises the computing system configured to execute the mobile application on the emulated mobile device.

13. The communication system of claim 8 wherein the web server configured to execute the server security component of the web service to process the attributes to determine whether or not the mobile application is being executed on the physical mobile device comprises the web server configured to execute the server security component of the web service to compare a total number of the attributes to a threshold number of attributes to determine whether or not the mobile application is being executed on the physical mobile device.

14. The communication system of claim 8 wherein the hardware detection techniques utilized by the client security component comprise polling the physical hardware components to determine the presence or absence of the physical hardware components in the computing system.

15. An apparatus comprising:
   one or more non-transitory computer-readable storage media; and
   first program instructions comprising a client security component of a mobile application, the first program instructions stored on the one or more non-transitory computer-readable storage media that, when executed by a computing system, direct the computing system to at least:
      collect attributes associated with the computing system and an operating environment on which the mobile application is executing, wherein the attributes include hardware attributes representative of the physical configuration of the computing system and installed application attributes representative of software applications installed on the computing system, wherein the client security component utilizes hardware detection techniques to detect the presence or absence of physical hardware components in the computing system to determine the hardware attributes representative of the physical configuration of the computing system;
      include the attributes in a web service request generated by the mobile application; and
      utilize a mobile application programming interface to transfer the web service request including the attributes for delivery to a web server; and
   second program instructions comprising a server security component of a web service, the second program instructions stored on the one or more computer-readable storage media that, when executed by the web server, direct the web server to at least:
extract the attributes from the web service request; and
process the attributes to determine whether the mobile application is being executed on a physical mobile device or on an emulated mobile device.

16. The apparatus of claim 15 wherein the computing system is operatively coupled to the one or more non-transitory computer-readable storage media and the computing system reads and executes the first program instructions.

17. The apparatus of claim 15 wherein the web server is operatively coupled to the one or more non-transitory computer-readable storage media and the web server reads and executes the second program instructions.

18. The apparatus of claim 15 wherein the computing system comprises the physical mobile device on which the mobile application is being executed.

19. The apparatus of claim 15 wherein the computing system is running the emulated mobile device and the mobile application is being executed on the emulated mobile device.

20. The apparatus of claim 15 wherein the second program instructions direct the web server to process the attributes to determine whether or not the mobile application is being executed on the physical mobile device by directing the web server to compare a total number of the attributes to a threshold number of attributes to determine whether or not the mobile application is being executed on the physical mobile device.

* * * * *